US010353200B2

(12) United States Patent
Aoki et al.

(10) Patent No.: US 10,353,200 B2
(45) Date of Patent: Jul. 16, 2019

(54) LAMINATED GLASS

(71) Applicant: AGC Inc., Chiyoda-ku (JP)

(72) Inventors: Tokihiko Aoki, Chiyoda-ku (JP); Shunsuke Sadakane, Chiyoda-ku (JP); Ayaka Ikegami, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/641,446

(22) Filed: Jul. 5, 2017

(65) Prior Publication Data
US 2018/0017789 A1  Jan. 18, 2018

(30) Foreign Application Priority Data

Jul. 15, 2016  (JP) ................................ 2016-140812

(51) Int. Cl.
*G02B 27/01* (2006.01)
*B60J 1/02* (2006.01)
(Continued)

(52) U.S. Cl.
CPC .... *G02B 27/0101* (2013.01); *B32B 17/10036* (2013.01); *B32B 17/1077* (2013.01); *B32B 17/10174* (2013.01); *B32B 17/10348* (2013.01); *B32B 17/10568* (2013.01); *B32B 17/10743* (2013.01); *B32B 17/10761* (2013.01); *B32B 17/10779* (2013.01); *B32B 17/10788* (2013.01);
(Continued)

(58) Field of Classification Search
CPC ............................ G02B 27/0101; G02B 27/01; G02B 27/0018; B32B 17/10036; B32B 17/00; B32B 17/10174; B32B 17/10348; B32B 17/10568; B32B 17/10761; B32B 17/1077; B32B 17/10779; B32B 17/10788; B60J 1/02
USPC ........................................................ 359/630
See application file for complete search history.

(56) References Cited

U.S. PATENT DOCUMENTS 5,812,332 A    9/1998  Freeman
6,414,796 B1 *  7/2002  Muromachi ...... B32B 17/10036
                                                   340/980
(Continued)

FOREIGN PATENT DOCUMENTS

JP          2014-24752      2/2014
WO    WO 2015/086234 A1    6/2015
(Continued)

*Primary Examiner* — William R Alexander
(74) *Attorney, Agent, or Firm* — Oblon, McClelland, Maier & Neustadt, L.L.P.

(57) ABSTRACT

A laminated glass includes first and second glass plates to be arranged on a vehicle inner side and outer side, respectively; and an intermediate film positioned between the first and second glass plates and bonded to the glass plates. The laminated glass includes a first region, a transition region, and a second region, from a lower side of the laminated glass. Each of the first and second regions includes a region having a wedge-shaped cross section, in which an upper edge side thickness is greater than a lower edge side thickness, or having a thickness that is constant. The transition region connects the first and second regions, and includes a region having a wedge-shaped cross section, in which an upper edge side thickness is greater than a lower edge side thickness. At least one of the first and second regions includes a region used for a head up display.

10 Claims, 9 Drawing Sheets

(51) Int. Cl.
  *G02B 27/00* (2006.01)
  *B32B 17/10* (2006.01)
  *B60K 35/00* (2006.01)

(52) U.S. Cl.
  CPC ............ *B60J 1/02* (2013.01); *G02B 27/0018* (2013.01); *G02B 27/01* (2013.01); *B60K 35/00* (2013.01); *G02B 2027/012* (2013.01); *G02B 2027/0121* (2013.01); *G02B 2027/0194* (2013.01)

(56) References Cited

U.S. PATENT DOCUMENTS

| | | | | |
|---|---|---|---|---|
| 7,846,532 B2 * | 12/2010 | Lu | ............................ | B32B 17/10 156/102 |
| 9,915,822 B2 * | 3/2018 | Arndt | ................ | B32B 17/10036 |
| 10,175,480 B2 * | 1/2019 | Zhao | .................. | G02B 27/0101 |
| 2002/0008926 A1 | 1/2002 | Freeman | | |
| 2003/0026964 A1 * | 2/2003 | Muromachi | ....... | G02B 27/0101 428/212 |
| 2004/0109251 A1 | 6/2004 | Freeman | | |
| 2005/0158520 A1 | 7/2005 | Freeman | | |
| 2007/0148472 A1 * | 6/2007 | Masaki | ............. | B32B 17/10036 428/426 |
| 2010/0314900 A1 | 12/2010 | Labrot et al. | | |
| 2013/0342913 A1 * | 12/2013 | Tsimhoni | ................ | G02B 27/01 359/630 |
| 2016/0163108 A1 * | 6/2016 | Kim | ................... | G02B 27/0101 345/633 |
| 2016/0168353 A1 | 6/2016 | Spangler et al. | | |
| 2016/0291324 A1 * | 10/2016 | Arndt | ................ | B32B 17/10036 |
| 2017/0003503 A1 | 1/2017 | Arndt et al. | | |
| 2017/0072663 A1 | 3/2017 | Sadakane et al. | | |
| 2017/0274631 A1 * | 9/2017 | Oota | ....................... | B32B 27/18 |
| 2017/0313032 A1 | 11/2017 | Arndt et al. | | |
| 2017/0343806 A1 * | 11/2017 | Anzai | ................. | G02B 27/0101 |
| 2017/0343809 A1 * | 11/2017 | Benesh | .................. | G09G 5/00 |
| 2017/0363863 A1 * | 12/2017 | Chen | .................. | G02B 27/0018 |
| 2017/0364029 A1 * | 12/2017 | Cho | ......................... | G02B 1/14 |
| 2018/0149865 A1 * | 5/2018 | Arndt | ................. | G02B 27/0101 |
| 2018/0149867 A1 * | 5/2018 | Kremers | ............ | G02B 27/0101 |
| 2018/0341110 A1 * | 11/2018 | Hirata | ................... | B60K 35/00 |

FOREIGN PATENT DOCUMENTS

| | | |
|---|---|---|
| WO | WO 2015/134836 A1 | 9/2015 |
| WO | WO 2016/017566 A1 | 2/2016 |
| WO | WO 2016/091435 A1 | 6/2016 |
| WO | WO 2017/175639 A1 | 10/2017 |

\* cited by examiner

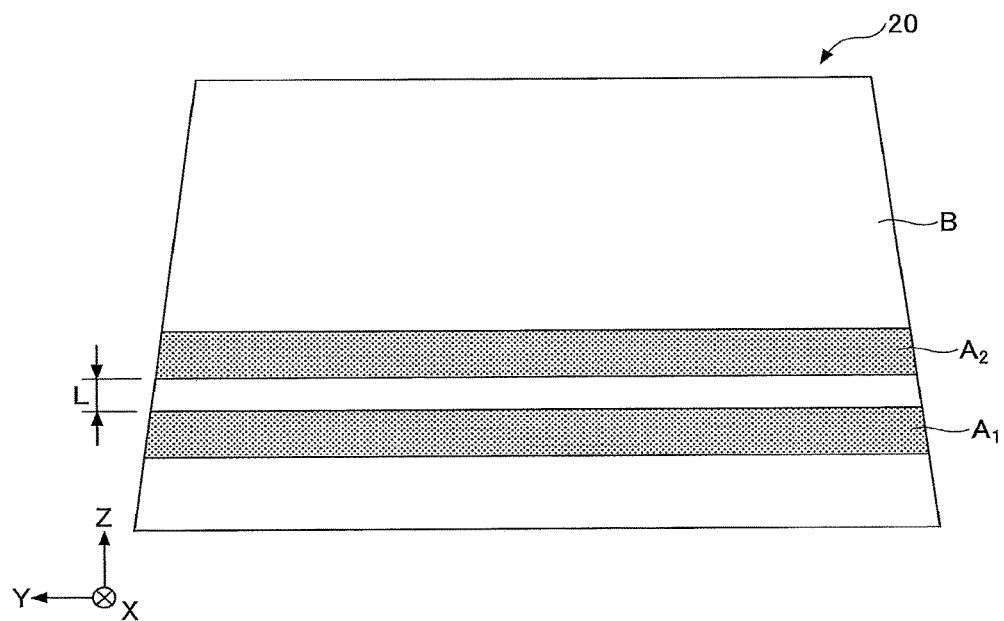
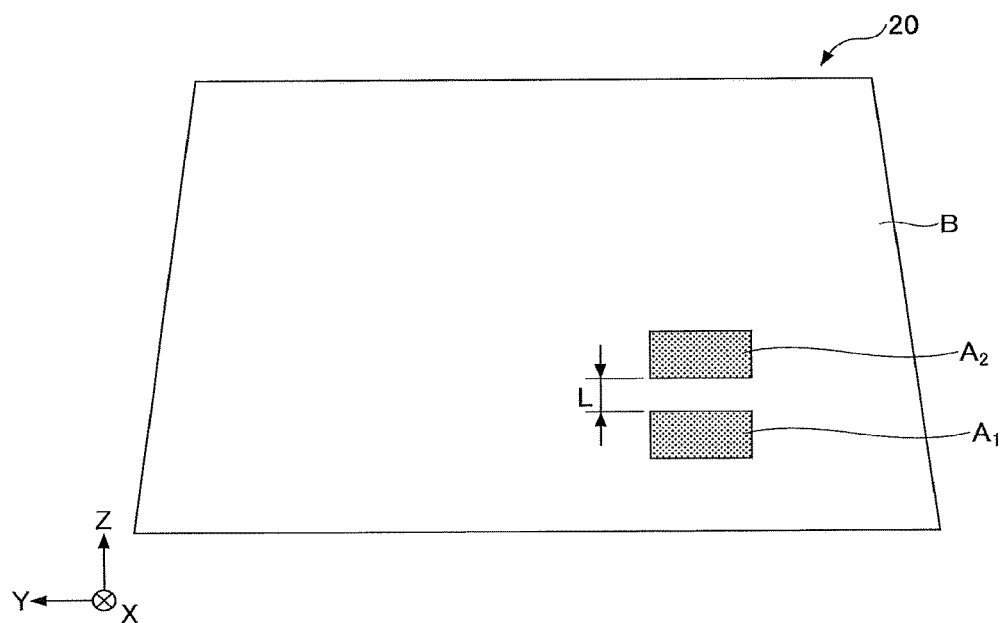

FIG.11

| | MAXIMUM WEDGE ANGLE δmax | | MINIMUM WEDGE ANGLE δmin | | MAXIMUM SLOPE mmax | | |mmax × t| | DEVIATION FROM DESIGNED VALUE |
|---|---|---|---|---|---|---|---|---|
| | WEDGE ANGLE [mrad] | POSITION [mm] | WEDGE ANGLE [mrad] | POSITION [mm] | SLOPE [mrad/mm] | POSITION [mm] | | |
| 2.0 / 2.0 (COMPARATIVE EXAMPLE) | 0.698 | 205 | 0.405 | 275 | 0.00428 | 230 | 0.00856 | 3.438 |
| 2.0 / 1.6 (PRACTICAL EXAMPLE 1) | 0.802 | 190 | 0.403 | 270 | 0.00475 | 225 | 0.00760 | 3.021 |
| 2.0 / 1.1 (PRACTICAL EXAMPLE 2) | 0.863 | 170 | 0.446 | 265 | 0.00462 | 215 | 0.00508 | 1.704 |

LAMINATED GLASS

CROSS-REFERENCE TO RELATED APPLICATION

The present application is based on and claims benefit of priority under 35 U.S.C. § 119 of Japanese Patent Applications No. 2016-140812, filed Jul. 15, 2016. The contents of the application are incorporated herein by reference in their entirety.

BACKGROUND OF THE INVENTION

1. Field of the Invention

The disclosure herein generally relates to a laminated glass.

2. Description of the Related Art

In recent years, head-up displays (in the following, also referred to as an "HUD") have become more and more popular. In a head-up display, an image is reflected on a front windshield of a vehicle so that predetermined information is displayed in a driver's view. However, for driver viewing of a view outside the vehicle or of the information displayed by the HUD, there may be a case where a double image is a problem.

A double image that becomes a problem for a driver of a vehicle includes a transparent double image and a reflected double image. When the front windshield includes a HUD display region used for the HUD and a region outside the HUD display region (transparent region) that is not used for the HUD, although a transparent double image may be a problem in the HUD display region, generally a reflected double image is the main problem, and in the region outside the HUD display region a transparent double image is a problem.

It has been known that such reflected double image or transparent double image can be reduced by using, for a front windshield, a laminated glass having a cross-section having a shape of a wedge viewed from the horizontal direction. For example, a laminated glass obtained by holding with two glass plates an intermediate film having a cross section having a shape of a wedge, a wedge angle of the intermediate film being changed depending on a location in the front windshield, has been proposed (See, for example, Japanese Unexamined Patent Application Publication No. 2014-024752).

Moreover, a laminated glass, in which one of two glass plates used for a front windshield is made thinner so as to reduce a weight, in order to improve fuel efficiency, and the two glass plates hold an intermediate film having a cross section having a shape of a wedge, has been proposed (See, for example WO 2015/134836).

SUMMARY OF THE INVENTION

However, with the laminated glass that has been proposed conventionally and a combination of the techniques thereof alone, it is difficult to obtain a high-quality transparent image and a high-quality reflected image.

The present invention was made in view of such a problem, and it is an object of the present invention to obtain a transparent image and a reflected image quality which are higher than with a conventional image, on a laminated glass having a wedge angle which is not constant.

According to an aspect of the present invention, a laminated glass includes a first glass plate to be arranged on an inner side of a vehicle; a second glass plate to be arranged on an outer side of the vehicle; and an intermediate film positioned between the first glass plate and the second glass plate and bonded to the first glass plate and to the second glass plate. The laminated glass includes a first region, a transition region, and a second region, from a lower side of the laminated glass when the laminated glass is attached to the vehicle. The first region includes a region having a cross section having a shape of a wedge, in which a thickness of an upper edge side is greater than a thickness of a lower edge side when the laminated glass is attached to the vehicle, or having a thickness that is constant. The transition region is a region connecting the first region and the second region, and includes a region having a cross section having a shape of a wedge, in which a thickness of an upper edge side is greater than a thickness of a lower edge side when the laminated glass is attached to the vehicle. The second region includes a region having a cross section having a shape of a wedge, in which a thickness of an upper edge side is greater than a thickness of a lower edge side when the laminated glass is attached to the vehicle, or having a thickness that is constant. In at least one of the first region and the second region, a region used for a head up display is present. In the first region, the transition region, and the second region, a difference between a maximum value and a minimum value of a wedge angle measured in a radial direction along the laminated glass is 0.05 mrad or more. When a slope of the wedge angle in an intermediate region in which the maximum value and the minimum value are present is m mrad/mm, and a plate thickness of the first glass plate is t mm, conditions $$0.3 \le t \le 1.6,$$

$$0.001 \le |m| \le 0.005, \text{ and}$$

$$|m \times t| \le 0.008$$

are satisfied.

According to an aspect of the present invention, in a laminated glass having a wedge angle that is not constant, a transparent image and a reflected image quality which are higher than with a conventional image can be obtained.

BRIEF DESCRIPTION OF THE DRAWINGS

Other objects and further features of embodiments will become apparent from the following detailed description when read in conjunction with the accompanying drawings, in which:

FIGS. 2A and 2B are diagrams for explaining a front windshield for a vehicle;

FIG. 11 is a table listing results in the comparative example and the practical example.

DETAILED DESCRIPTION OF THE PREFERRED EMBODIMENTS

Figure 1A:
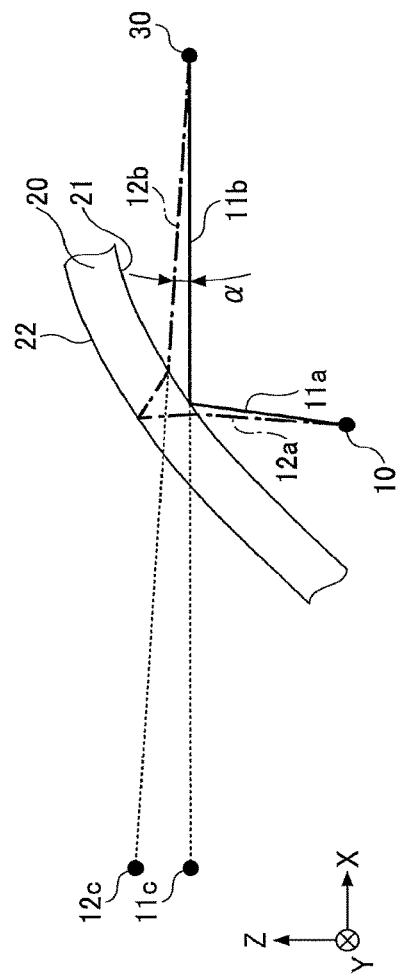
FIGS. 1A and 1B are diagrams for explaining a concept of a double image.

In the following, with reference to drawings, embodiments of the present invention will be described. In each drawing, the same reference numeral is assigned to the same components, and redundant explanation will be omitted. In the following, a front windshield of a vehicle will be described as an example, but the present invention is not limited to this, and the laminated glass according to the embodiment can also be applied to other than the front windshield of the vehicle.

[Reflected Double Image, Transparent Double Image]

Figure 1B:
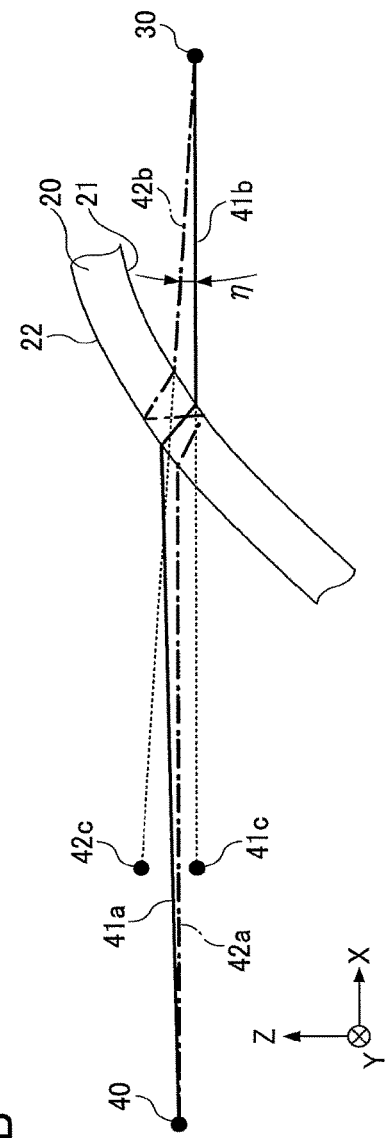

First, concepts of a reflected double image and a transparent double image will be described. FIGS. 1A and 1B are diagrams for explaining concepts of a double image. FIG. 1A illustrates a reflected double image, and FIG. 1B illustrates a transparent double image. In FIGS. 1A and 1B, a front-back direction of a vehicle in which the front windshield 20 is installed is the X-direction, a left-right direction of the vehicle is the Y-direction, and a direction perpendicular to an XY-plane is the Z-direction (The same applies to subsequent drawings).

As illustrated in FIG. 1A, a part of light beam 11a emitted from a light source 10 of HUD is reflected on an interior surface 21 of the front windshield 20 of the vehicle, and guided to an eye 30 of a driver as a light beam 11b (primary beam), and is visually recognized by the driver as an image 11c (virtual image) in front of the front windshield 20.

Moreover, a part of light beam 12a emitted from the light source 10 of HUD enters an interior from the interior surface 21 of the front windshield 20 of the vehicle, and is refracted. A part thereof is reflected on an exterior surface 22. Then, furthermore, the part thereof emerges from the interior surface 21 to the outside of the front windshield 20 of the vehicle by refraction, and guided to the eye 30 of the driver as a light beam 12b (secondary beam), and is visually recognized by the driver as an image 12c (virtual image).

In this way, the two images 11c and 12c visually recognized by the driver are reflected double images. Moreover, an angle between the light beam 11b (primary beam) and the light beam 12b (secondary beam) is an angle $\alpha$ of the reflected double image. The angle $\alpha$ of the reflected double image is preferably close to zero. In the present application, a reflected double image in the case where the secondary beam is viewed upwardly from the driver is defined as a positive value.

Moreover, as illustrated in FIG. 1B, a part of a light beam 41a emitted from a light source 40 enters an interior from the exterior surface 22 of the front windshield 20 of the vehicle and is refracted. Then, a part thereof emerge to the outside of the front windshield 20 from the interior surface 21 and is refracted, and guided to the eye 30 of the driver as a light beam 41b, and visually recognized by the driver as an image 41c.

Moreover, a part of a light beam 42a emitted from the light source 40 enters an interior from the exterior surface 22 of the front windshield 20 of the vehicle and is refracted. A part thereof is reflected on the interior surface 21. Then, furthermore, the part thereof is reflected on the exterior surface 22, and furthermore a part thereof emerges to the outside of the front windshield 20 from the interior surface 21 by refraction, and guided to the eye 30 of the driver as a light beam 42b, and visually recognized by the drive as an image 42c.

In this way, the two images 41c and 42c visually recognized by the driver are transparent double images. Moreover, an angle between the light beam 41b (primary beam) and the light beam 42b (secondary beam) is an angle $\eta$ of the transparent double image. The angle $\eta$ of the transparent double image is preferably close to zero.

[Front Windshield (Laminated Glass)]

FIGS. 2A and 2B are diagrams depicting a front windshield of a vehicle, and schematically a state in which the front windshield is visually recognized from inside the vehicle to the outside of the vehicle. In FIGS. 2A and 2B, as a matter of convenience, a HUD display region is indicated by a dotted patter.

As illustrated in FIG. 2A and FIG. 2B, the front windshield 20 includes, for example, a HUD display region $A_1$ used in HUD (first HUD display region) and a HUD display region $A_2$ (second HUD display region), and a region outside the HUD display region B that is not used in HUD (transparent region). The HUD display region $A_1$ and the HUD display region $A_2$ are regions in the front windshield irradiated with light from a mirror configuring HUD, which is rotated, and viewed from a V1 point with respect to JIS R3212.

In the examples illustrated in FIG. 2A and FIG. 2B, when the front windshield 20 is attached to the vehicle, the HUD display region $A_1$ and the HUD display region $A_2$ are arranged along the front windshield 20 at a prescribed interval L in the vertical direction, so as not to contact each other. The region outside the HUD display region B is arranged near the HUD display region $A_1$ or the HUD display region $A_2$.

The HUD display regions $A_1$, $A_2$ may be arranged over the entire Y-direction, as illustrated in FIG. 2A, or both the HUD display regions $A_1$, $A_2$ may be arranged in a part of the Y-direction, as illustrated in FIG. 2B. Alternatively, only one of the HUD display regions may be arranged in a part of the Y-direction. Moreover, when the HUD display region is arranged in a part of the Y-direction, length of the respective regions in the Y-direction need not be the same.

Moreover, when the HUD display region is arranged in a part of the Y-direction, positions of centers of the respective regions may be shifted in the Y-direction. Moreover, the front windshield 20 may include three or more HUD display regions which are arranged along the front windshield 20 at a prescribed interval L in the vertical direction so as not to contact each other.

Moreover, the front windshield 20 may include only one HUD display region. For example, the HUD display region included in the front windshield 20 may be only the HUD display region $A_1$, and the HUD display region $A_2$ may be absent (In this case, the HUD display region $A_2$, illustrated in FIGS. 2A and 2B, is a part of the region outside the HUD display region B).

Alternatively, the HUD display region included in the front windshield 20 may be only the HUD display region $A_2$, and the HUD display region $A_1$ may be absent (In this case, the HUD display region $A_1$, illustrated in FIGS. 2A and 2B, is a part of the region outside the HUD display region B).

Moreover, the region outside the HUD display region B may be provided with a region having a cross section having a shape of a wedge, in which a thickness of an upper edge side is greater than a thickness of a lower edge side when the laminated glass is attached to the vehicle, or having a thickness that is constant (may not be provided with the region having a cross section having a shape of a wedge).

The HUD display region is a region on the front windshield 20 that can reflect an image (virtual image) of HUD. When a concave mirror configuring the HUD is rotated and an image on the front windshield 20 is moved, a position at which the image on the front windshield 20 vanishes is present. The position is a boundary between the HUD display region and the region outside the HUD display region.

The HUD display region $A_1$ and the HUD display region $A_2$ are regions in which virtual images having different imaging distances are displayed. The imaging distance is a distance between a viewpoint of a driver and the virtual image. For example, the HUD display region $A_1$ is a region in which a virtual image is displayed near the vehicle (e.g. the imaging distance is less than 3 m), and the HUD display region $A_2$ is a region in which a virtual image is displayed far from the vehicle (e.g. the imaging distance is 3 m or more).

For example, in the HUD display region $A_2$, a speed of the vehicle is always displayed, and in the HUD display region $A_1$, a warning is displayed only when necessary. However, content of display illustrated here is an example, and the present invention is not limited to this. Moreover, the HUD display region $A_1$ may be a region in which a virtual image is displayed far from the vehicle (e.g. the imaging distance is 3 m or more), and the HUD display region $A_2$ may be a region in which a virtual image is displayed near the vehicle (e.g. the imaging distance is less than 3 m).

In the following description, the front windshield 20 is assumed to include the HUD display regions $A_1$ and $A_2$, as an example.

Figure 3:
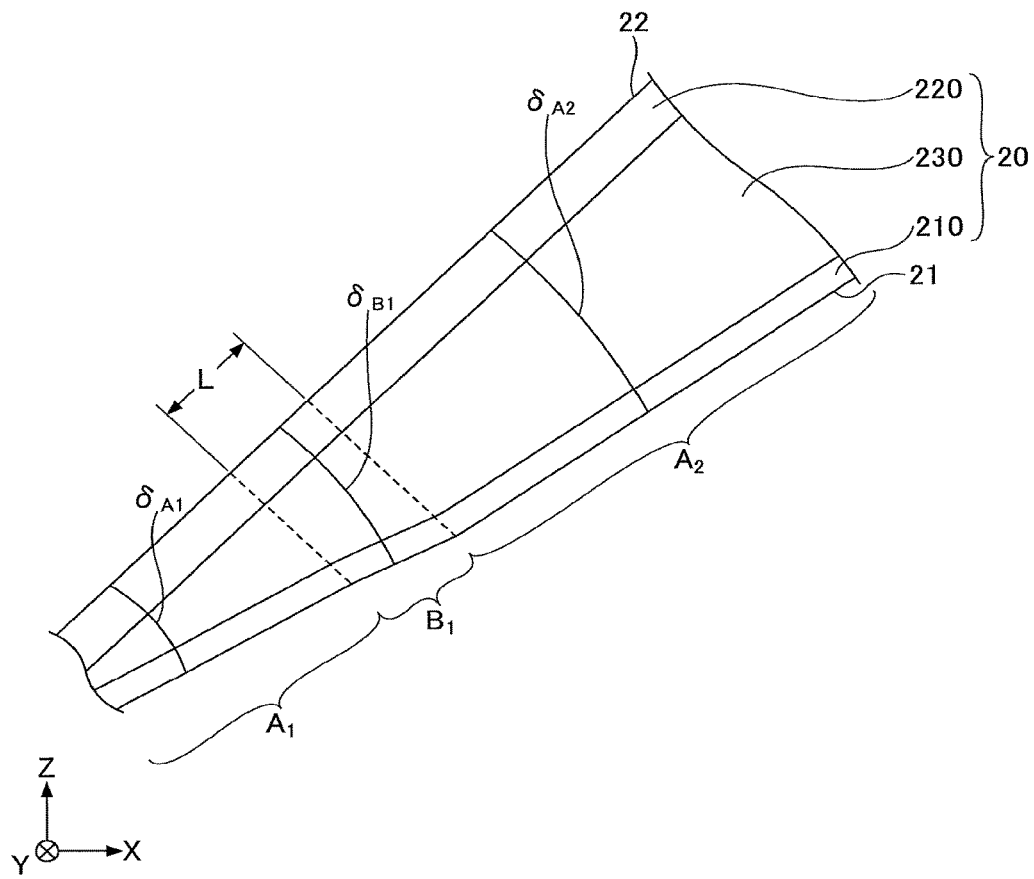
FIG. 3 is a partial cross-sectional diagram depicting the front windshield 20 illustrated in FIGS. 2A and 2B, cut along a XZ-direction and viewed from a Y-direction.

FIG. 3 is a partial cross-sectional diagram depicting the front windshield 20 illustrated in FIGS. 2A and 2B, cut along a XZ-direction and viewed from a Y-direction, and illustrates a neighborhood of the HUD display region $A_1$, a transition region $B_1$, and the HUD display region $A_2$. The transition region $B_1$ is a part of the region outside the HUD display region B.

As illustrated in FIG. 3, the front windshield is a laminated glass provided with a glass plate 210 that is a first glass plate, a glass plate 220 that is a second glass plate, and an intermediate film 230.

In the laminated glass, the glass plates 210 and 220 have lines generated by drawing upon manufacturing, respectively. The intermediate film 230 is located between the glass plate 210 and the glass plate 220, and bonds with the glass plate 210 and the glass plate 220 so that the lines in the glass plate 210 run, for example, orthogonally to the lines in the glass plate 220.

An interior surface 21 of the front windshield 20 that is one surface of the glass plate 210 which is inside the vehicle, and an exterior surface 22 of the front windshield 20 that is one surface of the glass plate 220 which is outside the vehicle may be flat surfaces or curved surfaces.

The HUD display region $A_1$ is formed so as to have a cross section having a shape of a wedge, in which a thickness varies from a lower edge side of the front windshield to an upper edge side when the front windshield 20 is attached to the vehicle, and a wedge angle is $\delta_{A1}$. The HUD display region $A_2$ is formed so as to have a cross section having a shape of a wedge, in which a thickness varies from a lower edge side of the front windshield to an upper edge side when the front windshield 20 is attached to the vehicle, and a wedge angle is $\delta_{A2}$.

The transition region $B_1$ is a region located between the HUD display region $A_1$ and the HUD display region $A_2$, formed so as to have a cross section having a shape of a wedge, in which a thickness varies from a lower edge side of the front windshield to an upper edge side when the front windshield 20 is attached to the vehicle, and a wedge angle is $\delta_{B1}$. The thickness of the transition region $B_1$ may vary non-linearly and continuously.

The region of the front windshield 20 where a cross section has a shape of a wedge is designed so that a wedge angle measured in the radial direction along the front windshield 20 is not constant. That is, the region of the front windshield 20 where a cross section has a shape of a wedge includes a region provided with a variable wedge angle.

In the front windshield 20, the wedge angles in the respective regions vary within a range of 0.1 mrad or more but 1.5 mrad or leas. Within a transparent region of the front windshield 20, a difference between the maximum value and the minimum value of the wedge angle measured in the vertical direction along the front windshield 20 is 0.5 mrad or more. This is because when the difference between the maximum value and the minimum value of the wedge angle is less than 0.05 mrad, an effect of the variable wedge angle cannot be applied, and there is no significance of using the variable wedge angle.

The difference of the wedge angle measured in the radial direction along the front windshield 20 is preferably 1.5 mrad or less. This is because when the wedge angle changed rapidly, upon pressure bonding of the intermediate film and the glass degassing failure may occur, or a quality of laminated glass other than reflected double images or transparent double images may degrade. Therefore, the difference of the wedge angle measured in the radial, direction along the front windshield 20 is preferably 0.05 mrad or more but 1.5 mrad or less, more preferably 0.1 mrad or more but 1.0 mrad or less, and further preferably 0.2 mrad or more but 0.8 mrad or less.

A slope m of the wedge angle in the front windshield 20 is preferably 0.001 mrad/mm, or more but 0.005 mrad/mm or less. This is because when the slope m of the wedge angle is less than 0.001 mrad/mm, changing the wedge angle becomes meaningless, and when the slope m is greater than 0.005 mrad/mm, even if the glass plates 210 and 220 follow a change in the shape of the intermediate film 230, the change is too rapid and a transparent distortion readily occurs in the region.

The above-described wedge angle δ is an average variation rate of a plate thickness of the front windshield 20 obtained by using the least squares method from 13 pieces of data, which are present within a range of 30 mm in front of and behind a certain point, of plate thicknesses of the front windshield 20 measured at an interval of 5 mm in the vertical direction when the front windshield 20 is attached to the vehicle. Moreover, the slope m of the wedge angle is an average variation rate of the wedge angles by using the least squares method within the same range.

The embodiment will be described as a mode in which the front windshield 20 includes two HUD display regions $A_1$ and $A_2$ with different wedge angles and a transition region $B_1$ that connects the HUD display regions. However, the embodiment may also be as a mode in which the wedge angle of the front windshield 20 varies according to a predetermined formula, or may be as a mode other than the above.

In the front windshield 20, the wedge angles of the respective regions are formed by making at least the intermediate film 230 to be a wedge film. In addition to this, any one of or both the glass plate 210 and the glass plate 220 may be formed in a shape of a wedge.

In the case of forming any one of or both the glass plate 210 and the glass plate 220 in a shape of a wedge, a condition upon manufacturing by using the float method will be devised. That is, by controlling circumferential velocities of a plurality of rolls arranged on both ends in a width direction of a glass ribbon that moves on a melted metal, a cross section of a glass in the width direction may be a concave shape, a convex shape, or a tapered shape, and a part that has an optional thickness change may be cut out.

The glass plates 210 and 220 each include streak-shaped fine concavity and convexity (lines) parallel with respect to the moving direction, by an extension upon manufacturing by using the float method. Upon using as a front windshield for a vehicle, when the lines are viewed in the horizontal direction with respect to a line of sight of an observer, a distortion occurs and a visibility degrades.

As the glass plates 210 and 220, for example, a soda lime glass, an alumino-silicate glass, an organic glass, or the like may be used. A plate thickness of the glass plate 220 located on the outside of the front windshield 20 is preferably 1.8 mm or more but 3 mm or less. When the plate thickness of the glass plate 220 is less than 1.8 mm, a resistance to flying stones is poor. When the plate thickness is greater than 3 mm, the glass plates become heavy and are difficult to be shaped.

The plate thickness of the glass plate 210 located on the inside of the front windshield 20 is preferably 0.3 mm or more but 1.6 mm or less. When the plate thickness of the glass plate 210 is less than 0.3 mm, the glass plate becomes difficult to be handled. When the plate thickness is greater than 1.6 mm, the glass plate 210 cannot follow a shape of the intermediate film 230 that is a wedge film. However, the respective plate thicknesses of the glass plates 210 and 220 are not necessarily constant, but may vary according to positions, as necessary.

The front windshield 20 may have a carved shape or also may not have a curved shape. In the case where the front windshield 20 has a curved shape, when two sheets of glass that are especially deeply curved are shaped as the glass plates 210 and 220, a difference in shape between two sheets (mismatch) occurs, and will greatly affect the glass quality (e.g. residual stress) after pressure bonding.

By using the variable wedge angle to make the plate thickness of the glass plate 210 greater than or equal to 0.3 mm but less than or equal to 1.6 mm, the glass quality (e.g. residual stress) can be maintained. Making the plate thickness of the glass plate 210 greater than or equal to 0.3 mm but less than or equal to 1.6 mm is especially effective for maintaining the glass quality of the glass that is deeply curved (e.g. residual stress).

When the front windshield 20 has a curved shape, the glass plates 210 and 220 are shaped by the float method, and afterwards bent and formed before bonding by the intermediate film 230. The bending and forming are performed while the glass is heated and softened. The heating temperature for the glass upon bending and forming is about 550° C. to 700° C.

Figure 4:
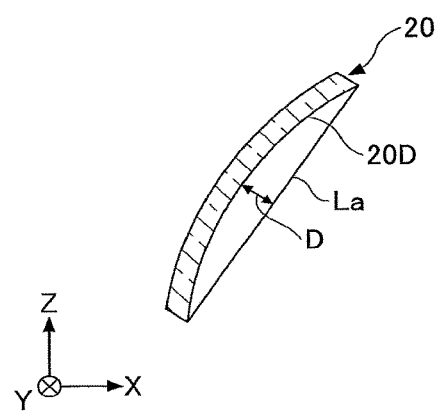
FIG. 4 is a cross-sectional diagram depicting the front windshield 20 illustrated in FIGS. 2A and 2B, cut along the XZ-direction and viewed from the Y-direction.

FIG. 4 is a cross-sectional diagram depicting the front windshield 20 illustrated in FIGS. 2A and 2B, cut along the XZ-direction and viewed from the Y-direction. As illustrated in FIG. 4, in the case where the front windshield 20 has a curved shape, a distance from a line La that connects the midpoints of the opposite sides of the concave face 20D that is the front windshield 20, among the longer of the two pairs of opposite sides, to the deepest portion of the concave face 20D, in a direction orthogonal to the line La, will be referred to as a maximum depth of curvature D of the front windshield 20.

When the maximum depth of curvature D of the front windshield 20 is 10 mm or more, the lines can be sufficiently extended by bending and forming, and the visibility can be sufficiently enhanced. The maximum depth of curvature D is preferably 12 mm or more, and more preferably 15 mm or more. Moreover, the radius of curvature of the concave face 20D is preferably 10000 mm or less.

Respective colors of the glass plates 210 and 220 are not especially limited, as long as a transmissivity of a visible light (Tv) is greater than 70%.

Moreover, in a peripheral portion of the front windshield 20, a shielding layer referred to as a so-called "black ceramic" is preferably present. The shielding layer is formed by applying a black ceramic ink for printing on a glass surface and baking the same. According to the shielding layer, a black obscure layer is formed in the peripheral portion of the front windshield 20. According to the black obscure layer, a resin such as a urethane for holding the front windshield 20 in the peripheral portion can be prevented from being degraded by ultraviolet light.

Moreover, a coat having a water-repellant function, an infrared light shielding function, an ultraviolet light shielding function, or a visible light reflectance reduction function, or a coat having a low radiation characteristic may be arranged outside the front windshield 20 (external surface of the glass plate 220) or inside (internal surface of the glass plate 210).

Returning back to the description of FIG. 3, as the intermediate film 230 for bonding the glass plate 210 and the glass plate 220, a thermoplastic resin is often used, including, a thermoplastic resin that has been used conventionally for this kind of purpose, such as a plasticized polyvinyl acetal resin, a plasticized polyvinyl chloride resin, a saturated polyester resin, a plasticized saturated polyester resin, a polyurethane resin, a plasticized polyurethane resin, an ethylene-vinyl acetate copolymer resin, or an ethylene-ethyl acrylate copolymer resin.

Among the above-described resins, a plasticized polyvinyl acetal resin is preferably used, because of its excellence in balance of performances, such as transparency, weather resistance, strength, bond strength, resistance to penetration, absorbability for impact energy, humidity resistance, thermal insulating property, and sound insulating property. The thermoplastic resin may be used independently, or two kinds or more resins may be used concurrently. The term "plasticized" in the plasticized polyvinyl acetal resin means that the resin is made plasticized by adding a plasticizing agent. The same applies to the other plasticized resins.

The polyvinyl acetal resin includes a polyvinyl formal resin that is obtained by reacting a polyvinyl alcohol (in the following, may be referred to as "PVA" as necessary) and a formaldehyde, a narrowly defined polyvinyl acetal resin that is obtained by reacting a PVA and an acetaldehyde, a polyvinyl butyral resin (in the following, may be referred to as "PVB" as necessary) that is obtained by reacting a PVA and a n-butyl aldehyde, and the like. Especially, a PVB is preferable, because of its excellence in balance of performances, such as transparency, weather resistance, strength, bond strength, resistance to penetration, absorbability for impact energy, humidity resistance, thermal insulating property, and sound insulating property. The polyvinyl acetal resin may be used independently, or two kinds or more resins may be used concurrently. However, a material forming the intermediate film 230 is not limited to a thermoplastic resin.

A thickness of the intermediate film 230 is preferably 0.5 mm or more even at the thinnest portion. When the thickness of the intermediate film 230 is less than 0.5 mm, a resistance to penetration that is required for a front windshield is not secured. Moreover, the thickness of the intermediate film 230 is preferably 3 mm or less even at the thickest portion. When the thickness of the intermediate film 230 is greater than 3 mm, a weight becomes greater, and a handleability becomes worse.

The intermediate film 230 may be provided with a region having a sound insulation function, an infrared light shielding function, an ultraviolet light shielding function, a shade band (function of reducing a visible light transmittance), or the like. Moreover, the intermediate film 230 may include three or more layers. For example, by configuring the intermediate film 230 with three layers, and making hardness of the central layer less than hardness of both adjacent layers, the sound insulation function can be enhanced. In this case, hardness of both the layers may be the same or may be different from each other.

In this way, when the number of layers of the intermediate film 230 increases, thicknesses of the respective layers vary, and for example, an optical quality such as the transparent double image which is described above may be further degraded. In this case, by making the plate thickness of the glass plate 210 greater than or equal to 0.3 mm but less than or equal to 1.6 mm, the glass plate 210 becomes easy to follow the wedge film of the intermediate film 230, and thereby the optical quality can be prevented from degrading. That is, making the plate thickness of the glass plate 210 greater than or equal to 0.3 mm but less than or equal to 1.6 mm is especially effective when the layer number in the intermediate film 230 increases.

Normally, a light source for HUD is located in a lower part of the vehicle interior, and projects an image toward the laminated glass. Because the projected image is reflected on the rear surface and the front surface of the glass plates 210 and 220, in order to overlay both the reflected images so as not to generate a double image, the thickness of the glass is required to vary in parallel with respect to the projection direction. When the thickness of the glass plate 210 varies in a direction orthogonal to the lines, in order to be used as a glass, on which information is projected, the direction of the lines is orthogonal to the projection direction, i.e. the lines are in a horizontal direction with a line of sight of an observer inside the vehicle interior (driver), and it is required to use in a direction in which the visibility degrades.

In order to improve the visibility, the laminated glass prepared using the glass plate 210, the glass plate 220, and the intermediate film 230 is arranged so that the lines of the glass plate 210 are orthogonal to the lines of the glass plate 220. According to the above-described arrangement, the distortion, which becomes worse with the glass plate 210 only, will be reduced by the presence of the glass plate 220, in which the lines are orthogonal, and the intermediate film 230 that bonds the glass plate 210 and the glass plate 220, and the visibility is improved.

When the glass plates 210 and 220 are not wedge glass, in the glass plates 210 and 220, the lines are orthogonal to the line of sight of the observer inside the vehicle interior (driver), and thereby the visibility does not degrade.

In order to prepare the laminated glass, the intermediate film 230 is held between the glass plate 210 and the glass plate 220 to form a laminated body. Then, the laminated body is placed into a rubber sack, and the bonding is performed under a vacuum of −65 to −100 kPa, and at temperature of about 70 to 110° C.

Furthermore, for example, by performing a pressure bonding process of heating and pressurizing under a condition of a temperature of 100 to 150° C., and a pressure of 0.6 to 1.3 MPa, a laminated glass that is more excellent in durability can be obtained. However, in some cases, taking into account simplification of processes, and characteristic of a material enclosed in the laminated glass, the heating and pressurizing process may not need to be used.

Between the glass plate 210 and the glass plate 220, other than the intermediate film 230, a film or a device having a function of a heating wire, infrared light reflection, a light emission, a power generation, dimming, visible light reflection, scattering, decoration, absorption or the like may be arranged.

Figure 5:
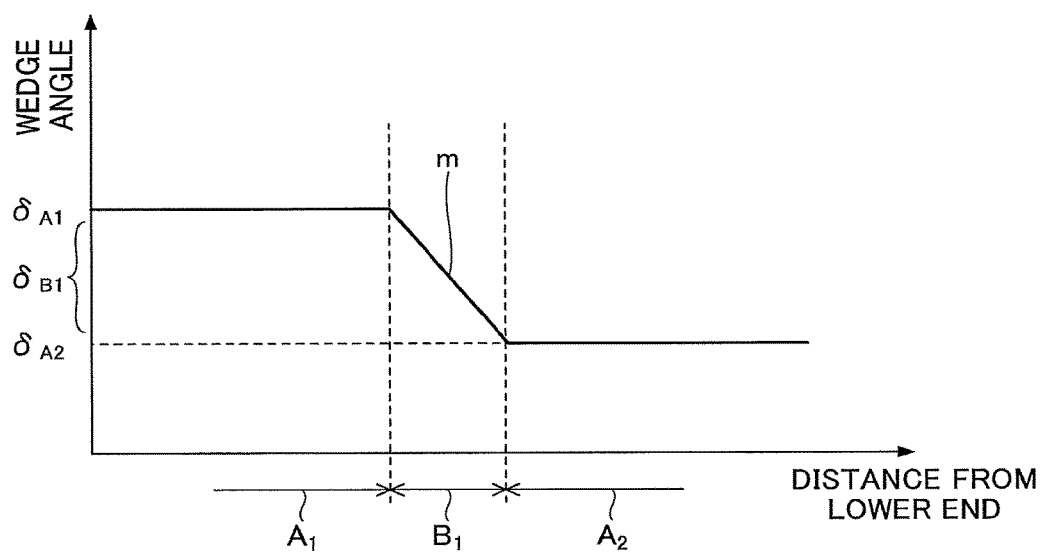
FIG. 5 is a diagram depicting an example of a size of a wedge angle in a HUD display region $A_1$, a transition region $B_1$ and a HUD display region $A_2$.

FIG. 5 is a diagram depicting an example of sizes of wedge angles in a HUD display region $A_1$, a transition region $B_1$ and a HUD display region $A_2$. In FIG. 5, the horizontal axis indicates a distance in the radial direction from the lower edge of the front windshield 20, and the vertical axis indicates a wedge angle.

As illustrated in FIG. 5, the wedge angle $\delta_{A1}$ of the HUD display region $A_1$ and the wedge angle $\delta_{A2}$ of the HUD display region $A_2$ are set to be values different from each other. This is because the HUD display region $A_1$ and the HUD display region $A_2$ are regions in which virtual images having different imaging distances from each other are displayed, and optimum, wedge angles for removing reflected double images in the respective regions are different from each other.

FIG. 5 illustrates an example where the HUD display region $A_1$ is a region, in which a virtual image is displayed, near the vehicle (e.g. the imaging distance is less than 3 m), and the HUD display region $A_2$ is a region in which a virtual image is displayed far from the vehicle (e.g. the imaging distance is 3 m or more). Therefore, the wedge angle $\delta_{A1}$ (constant) is set to be greater than the wedge angle $\delta_{A2}$ (constant).

In the case where the HUD display region $A_1$ is a region in which a virtual image is displayed far from the vehicle (e.g. the imaging distance is 3 m or more), and the HUD display region $A_2$ is a region in which a virtual image is displayed near the vehicle (e.g. the imaging distance is less than 3 m), contrary to FIG. 5, the wedge angle $\delta_{A1}$ (constant) is required to be less than the wedge angle $\delta_{A2}$ (constant).

Figure 6:
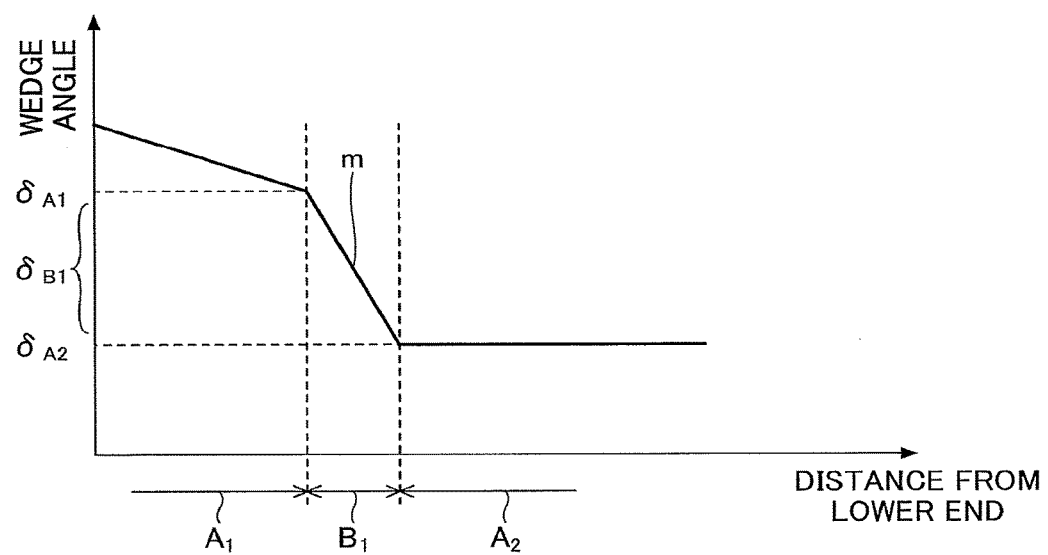
FIG. 6 is a diagram depicting another example of the size of the wedge angle in the HUD display region $A_1$, the transition region $B_1$ and the HUD display region $A_2$.
Figure 7:
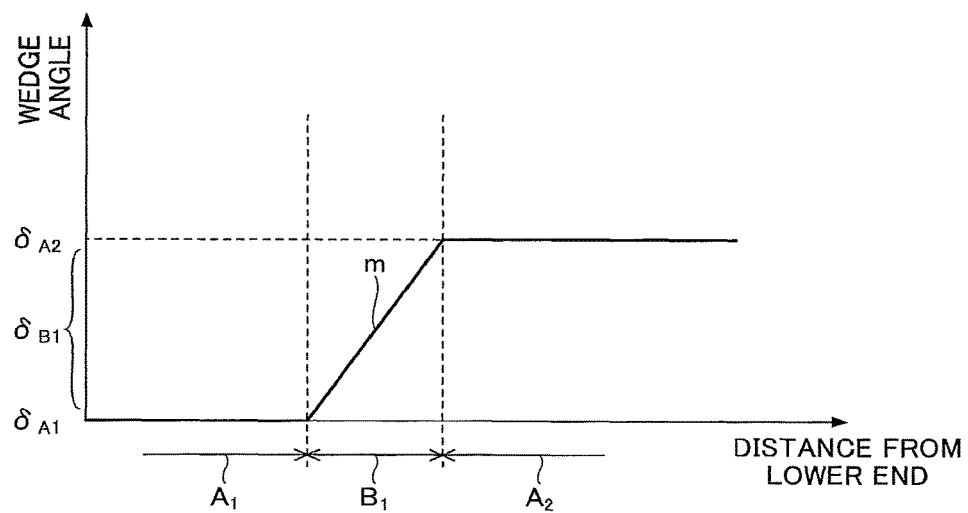
FIG. 7 is a diagram depicting yet another example of the size of the wedge angle in the HUD display region $A_1$, the transition region Bi and the HUD display region $A_2$.
Figure 8:
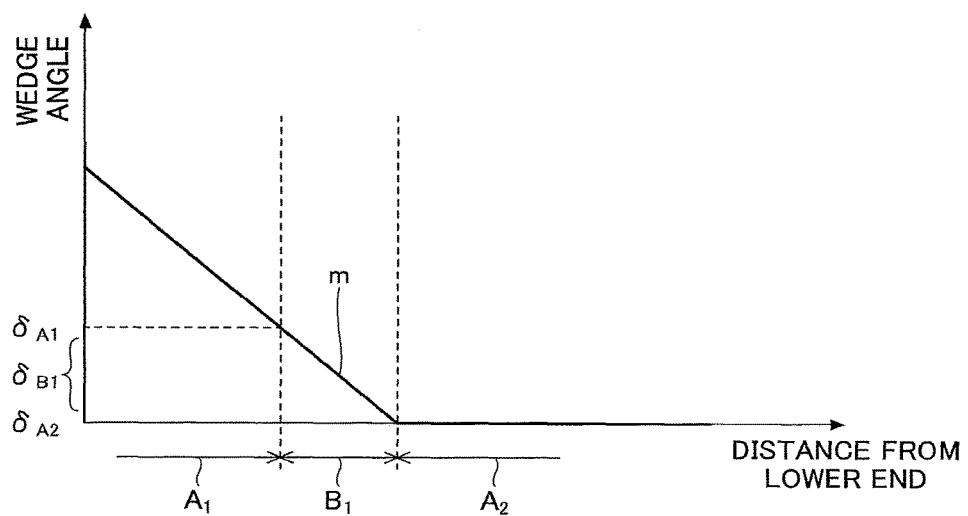
FIG. 8 is a diagram depicting still another example of the size of the wedge angle in the HUD display region $A_1$, the transition region Bi and the HUD display region $A_2$.

However, while in the example illustrated in FIG. 5, the wedge angle $\delta_{A1}$ and the wedge angle $\delta_{A2}$ are constants, the wedge angle $\delta_{A1}$ and the wedge angle $\delta_{A2}$ are not regained to be constant. In such a case, an average wedge angle in the HUD display region $A_1$ and an average wedge angle in the HUD display region $A_2$ are set to be different from each other (e.g. See FIG. 6). Moreover, any of the wedge angle $\delta_{A1}$ and the wedge angle $\delta_{A2}$ may be zero (e.g. See FIGS. 7 and 8).

When regions having different wedge angles from each ether are arranged in contact with each other, in a region in which the wedge angle changes rapidly, a large reflection double image is generated. Therefore, in the embodiment, a transition region $B_1$ is arranged between the HUD display region A1 and the HUD display region $A_2$. The HUD display regions $A_1$ and $A_2$ are separated by a prescribed interval L, and the wedge angle is changed in the transition region $B_1$ from the HUD display region $A_1$ to the HUD display region $A_2$ with a slope m. According to the above-described configuration, the wedge angle can be prevented from varying rapidly between the HUD display region $A_1$ and the HUD display region $A_2$, and a large reflected double image can be prevented from being generated.

The average wedge angle is obtained by dividing a difference between a thickness of a lower edge of each HUD display region and a thickness of an upper edge in the radial direction along the front windshield 20 by a distance in the radial direction along the front windshield 20.

When the wedge angle in the HUD display region $A_1$ or $A_2$ is not constant, a slope of the wedge angle in the region may be the same as the slope in the transition region $B_1$. In this case, a boundary between the regions $A_1$ and $B_1$, or a boundary between the regions $B_1$ and $A_2$ is defined as a position where an image on the front windshield 20 vanishes when a concave mirror configuring the HUD is rotated and an image on the front windshield 20 is moved. The average wedge angle can also be defined by, in each region, a difference between a thickness of a lower edge and a thickness of an upper edge in the radial direction divided by a distance in the radial direction.

The prescribed interval L is preferably 20 mm or more. The reason why the prescribed interval L is preferably 20 mm or more is that shifting of the viewpoint of the driver readily occurs for a prescribed interval of 20 mm. That is, because when rise prescribed interval L is 20 mm or more, viewpoint, shifting does not occur as readily between the HUD display region $A_1$ and the HUD display region $A_2$, images having different focal lengths can be prevented from being viewed close to each other, and it is possible to prevent a feeling of driver discomfort.

However, the prescribed interval L is more preferably 30 mm or more. The reason is that when a change in a wedge angle is great, a danger of a transparent distortion or forming increases; but, when the prescribed interval L is made greater than or equal to 30 mm and the change in the wedge angle is made smaller the danger can thereby be reduced. Moreover, by making the prescribed interval greater than or equal to 50 mm or greater than or equal to 100 mm, the change in the wedge angle can be made further smaller, and the danger can be further reduced.

When the imaging distance becomes longer, the wedge angle may become unnecessary to be arranged in the HUD display region. That is, a part of the plurality of HUD display regions may not be provided with a wedge angle.

[Example]

Figure 9:
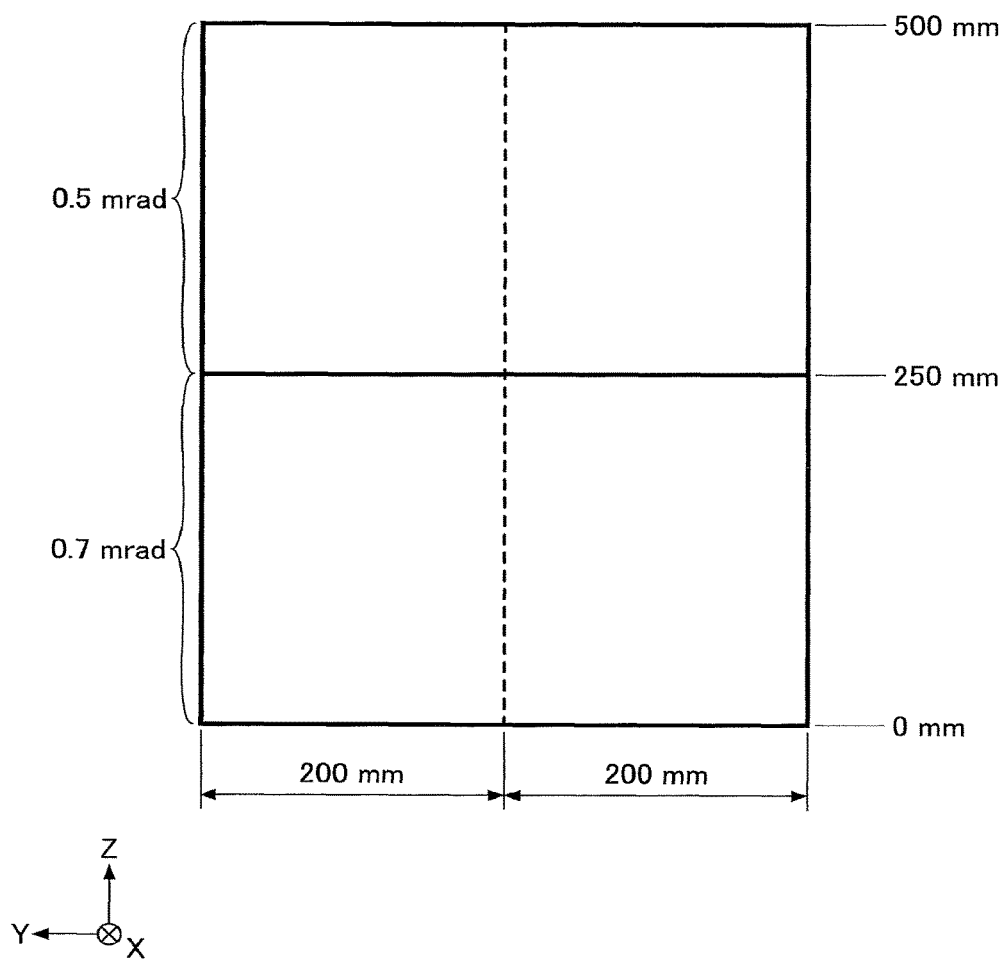
FIG. 9 is a diagram for explaining a laminated glass prepared in a comparative example and in a practical example.

As illustrated in FIG. 9, intermediate films of 0.5 mrad and 0.7 mrad were arranged adjacent to each other, and held between two glass plates from front and back sides, to form a curved laminated glass having a size of 500 mm (vertical) and 400 mm (horizontal). By varying a plate thickness of the glass plate acting as an interior plate, a plurality of kinds of laminated glass were prepared.

Specifically, as a comparative example, a laminated glass, in which a plate thickness of a glass plate acting as an exterior plate (in the following, simply referred to as an exterior plate)/a plate thickness of a glass plate acting as an interior plate (in the following, simply referred to as an interior plate) was 2.0 mm/2.0 mm, was prepared.

Moreover as a practical example 1, a laminated glass, in which the plate thickness of the exterior plate/the plate thickness of the interior plate was 2.0 mm/1.6 mm, was prepared. Moreover, as a practical example 2, a laminated glass, in which, the plate thickness of the exterior plate/the plate thickness of the interior plate was 2.0 mm/1.1 mm, was prepared.

After preparing the respective laminated glass, by using the multi-layered film thickness measurement system, Opti-Gauge by Lumetrics Inc., plate thicknesses of each laminated glass were measured at 5 mm intervals from 0 mm to 500 mm along a measurement line, indicated by a dashed line in FIG. 9, and the wedge angles were calculated by using the above-described method.

Figure 10:
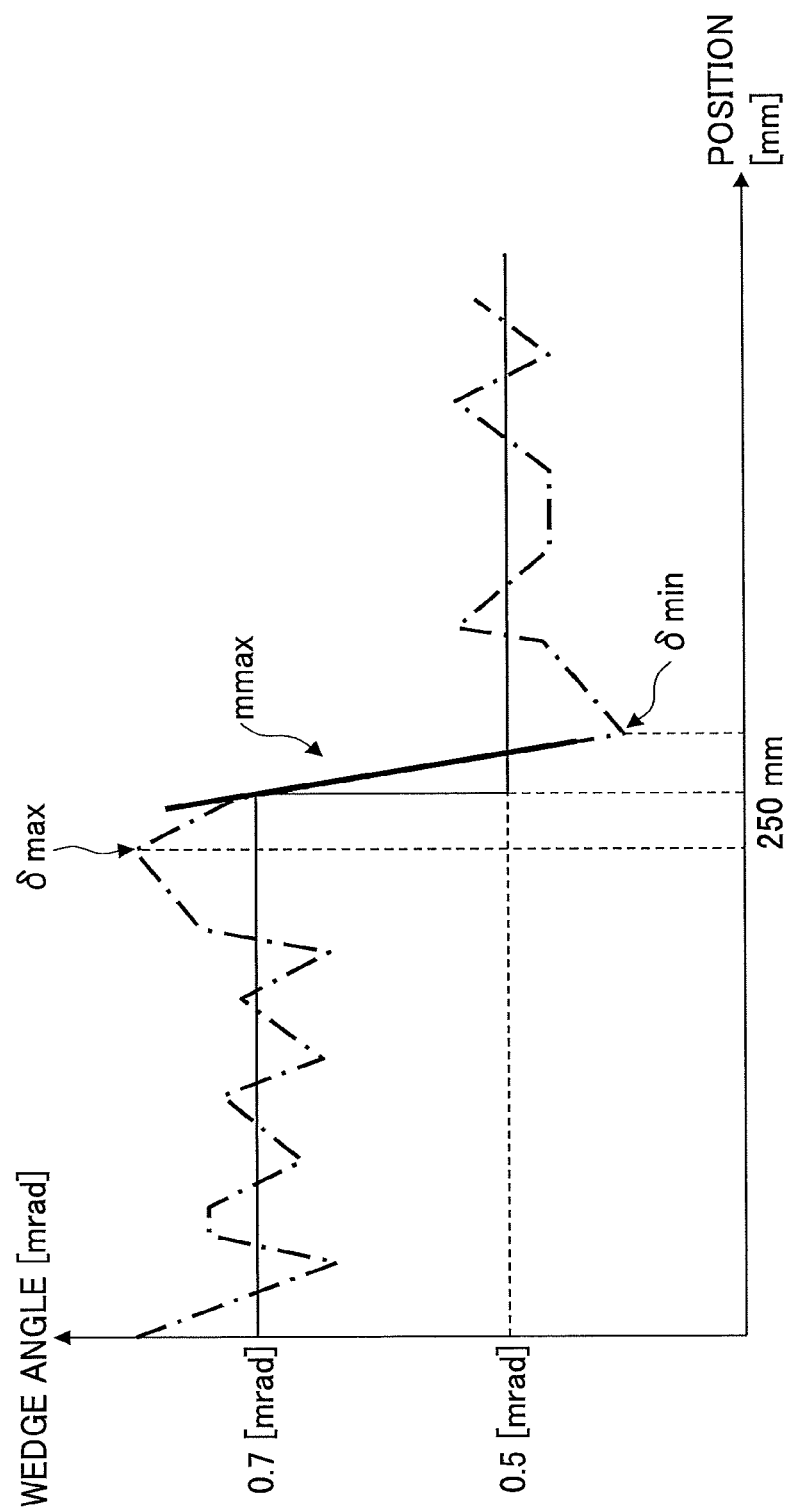
FIG. 10 is a diagram schematically depicting an example of the wedge angle calculated in the comparative example and the practical example.

Moreover, for the wedge angles measured within a range from 150 mm to 430 mm of the measurement line in FIG. 9, as schematically illustrated in FIG. 10 as an example, the maximum wedge angle $\delta_{max}$ and a position thereof, the minimum wedge angle $\delta_{min}$ and a position thereof, and the maximum slope of the wedge angle $m_{max}$ in the range between the maximum wedge angle $\delta_{max}$ and the minimum wedge angle $\delta_{min}$ were obtained.

Moreover, total of a difference between a designed value of the wedge angle at 5 mm intervals and the wedge angle calculated in the comparative example, and a difference between the designed value and the wedge angle calculated in the practical example (difference from the designed value) was obtained. The designed value of the wedge angle at 5 mm intervals is 0.7 mrad in the range from 150 mm to 250 mm, and 0.5 mrad in the range from 250 mm to 430 mm, and is indicated by solid line. Moreover, the wedge angles calculated in the comparative example and the practical example are schematically indicated by dashed-dotted lines in FIG. 10.

Figure 12:
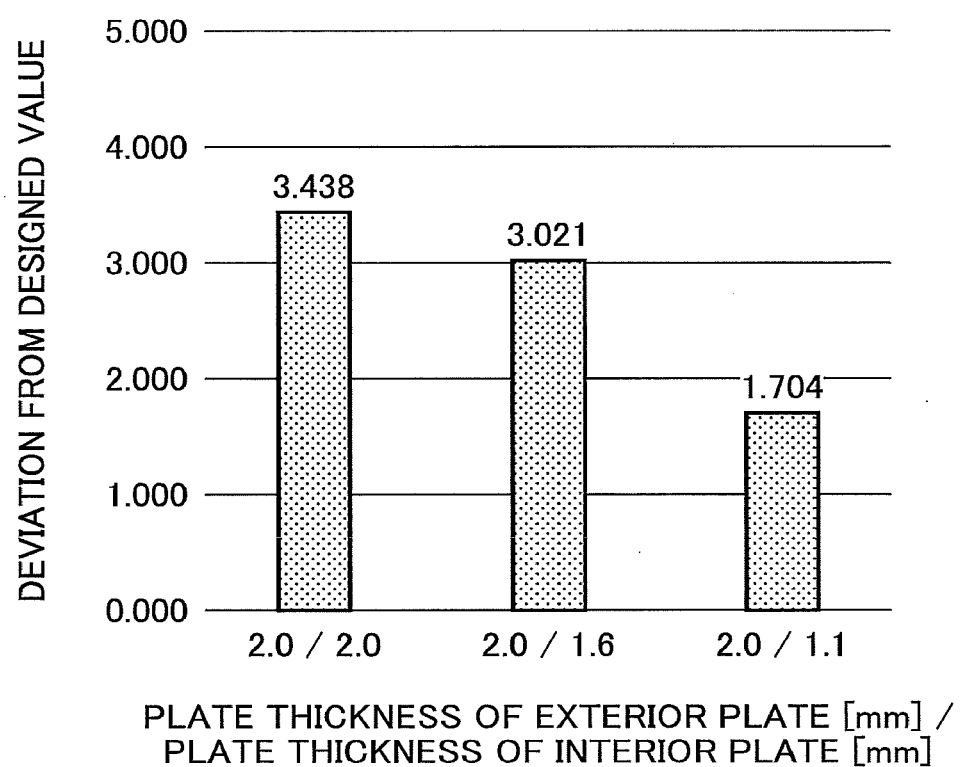
FIG. 12 is a diagram depicting the results in the comparative example and the practical example.

The results are illustrated in FIG. 11 and FIG. 12. As illustrated in FIG. 11, and FIG. 12, in any of the comparative example and the practical example, the maximum slope $m_{max}$ exists between the maximum wedge angle $\delta_{max}$ and the minimum wedge angle $\delta_{min}$. Moreover, the difference from the designed value is the greatest in the comparative example in which the plate thickness of the external plate and the plate thickness of the internal plate are the same, and the difference decreases as the plate thickness of the internal plate becomes thinner.

Moreover, from the results in FIG. 11 and FIG. 12, it is found that also in a laminated glass having a variable wedge angle using a thin glass plate with the plate thickness t of the internal plate of 1.6 mm or less, when the relation $0.001 \leq |m| \leq 0.005$ and $|m \times t| \leq 0.008$ are satisfied, the difference from the designed value of the wedge angle is reduced, and the wedge angle can be controlled precisely.

Because the wedge angle can be controlled precisely, also in the laminated glass having a variable wedge angle using a thin glass plate with the plate thickness t of the internal plate of 1.6 mm or less, a transparent double image can be prevented from occurring, and a high-quality transparent image and a high-quality reflected image can be obtained compared with the conventional images.

As described above, when the difference between the maximum value of the wedge angle and the minimum value of the wedge angle is less than 0.05 mrad in the transparent region of the front windshield 20, the effect of the variable wedge angle cannot be applied, and there is no significance of using the variable wedge angle. Moreover, when the plate thickness t of the internal plate is less than 0.3 mm, the glass plate becomes difficult to be handled. By adding these results to the results in FIG. 11 and FIG. 12, in order to prevent a transparent double image from occurring, and to obtain a high-quality transparent image and a high-quality reflected image compared with the conventional images, in the transparent region in the front windshield 20, the difference between the maximum value and the minimum value of the wedge angle is required to be 0.05 mrad or more, and the relations $0.3 \leq t \leq 1.6$, $0.001 \leq |m| \leq 0.005$, and $|m \times t| \leq 0.008$ are required to be satisfied.

As described above, the preferred embodiments and the like have been described in detail. However, the present invention is not limited to the above-described specific embodiments, but various variations and modifications may be made without deviating from the scope of the present indention.

What is claimed is:

1. A laminated glass, comprising:
   a first glass plate to be arranged on an inner side of a vehicle;
   a second glass plate to be arranged on an outer side of the vehicle; and
   an intermediate film positioned between the first glass plate and the second glass plate and bonded to the first glass plate and to the second glass plate,
   wherein the laminated glass includes a first region, a transition region, and a second region, from a lower side of the laminated glass when the laminated glass is attached to the vehicle,
   the first region includes a region having a cross section having a shape of a wedge, in which a thickness of an upper edge side is greater than a thickness of a lower edge side when the laminated glass is attached to the vehicle,
   the transition region is a region connecting the first region and the second region, and includes a region having a cross section having a shape of a wedge, in which a thickness of an upper edge side is greater than a thickness of a lower edge side when the laminated glass is attached to the vehicle,
   the second region includes a region having a cross section having a shape of a wedge, in which a thickness of an upper edge side is greater than a thickness of a lower edge side when the laminated glass is attached to the vehicle,
   each of the first region and the second region comprises a region for a head up display when the head up display is present,
   in the first region, the transition region, and the second region, a difference between a maximum value and a minimum value of a wedge angle measured in a radial direction along the laminated glass is 0.05 mrad or more,
   when a slope of the wedge angle in an intermediate region in which the maximum value and the minimum value are present is in mrad/mm, and a plate thickness of the first glass plate is t mm, conditions $0.3 \leq t \leq 1.6$, $0.001 \leq |m| \leq 0.005$, and $|m \times t| \leq 0.008$ are satisfied, and
   in the first region and the second region, virtual images having different imaging distances are displayed, and an average wedge angle in the first region is greater than an average wedge angle in the second region.

2. The laminated glass according to claim 1, wherein a thickness of the transition region varies non-linearly and continuously.

3. The laminated glass according to claim 1, wherein the plate thickness of the first glass plate is less than a plate thickness of the second glass plate.

4. The laminated glass according to claim 1, wherein a radius of curvature of the laminated glass is 10000 mm or less.

5. The laminated glass according to claim 1, wherein a maximum depth of curvature of the laminated glass is 10 mm or more.

6. The laminated glass according to claim 1, wherein the intermediate film includes three or more layers.

7. The laminated glass according to claim 1, wherein the imaging distance of either one of the first, region and the second region is less than 3 m, and the imaging distance of the other is greater than or equal to 3 m.

8. The laminated glass according to claim 1, wherein the difference between the maximum value and the minimum value of the wedge angle measured in the radial direction along the laminated glass is 0.05 mrad or more but 1.5 mrad or less.

9. The laminated glass according to claim 1, wherein a plate thickness of the second glass plate is 1.8 mm or more but 3 mm or less.

10. The laminated glass according to claim 1, further comprising a shielding layer.

* * * * *